United States Patent
Maritano

(10) Patent No.: US 9,828,729 B1
(45) Date of Patent: Nov. 28, 2017

(54) CONSTRUCTION OF A SYNTHETIC GRASS PLAYING FIELDS BY FLOORING PANELS

(71) Applicant: AGRIPOOL S.r.l., Desenzano del Garda, Brescia (IT)

(72) Inventor: Riccardo Maritano, Brescia (IT)

(73) Assignee: AGRIPOOL S.r.l., Desenzano del Garda, Brescia (IT)

( * ) Notice: Subject to any disclaimer, the term of this patent is extended or adjusted under 35 U.S.C. 154(b) by 0 days.

(21) Appl. No.: 15/164,565

(22) Filed: May 25, 2016

(51) Int. Cl.
| | |
|---|---|
| *E01C 23/00* | (2006.01) |
| *E01C 13/04* | (2006.01) |
| *E01C 11/02* | (2006.01) |
| *E01C 9/08* | (2006.01) |
| *B65G 57/11* | (2006.01) |
| *B65G 67/24* | (2006.01) |
| *B29C 45/00* | (2006.01) |
| *B29C 65/08* | (2006.01) |
| *B29C 65/00* | (2006.01) |
| *E01C 13/00* | (2006.01) |
| *B29L 31/52* | (2006.01) |

(52) U.S. Cl.
CPC .......... *E01C 13/045* (2013.01); *B29C 45/006* (2013.01); *B29C 65/08* (2013.01); *B29C 66/435* (2013.01); *B65G 57/11* (2013.01); *B65G 67/24* (2013.01); *E01C 9/086* (2013.01); *E01C 11/02* (2013.01); *B29L 2031/52* (2013.01); *E01C 2013/006* (2013.01)

(58) Field of Classification Search
CPC .. E01C 11/02; E01C 13/045; E01C 2013/006; B65G 57/11; B65G 67/24; B29C 65/08; B29C 66/435; B29C 45/006; B29L 2031/52

USPC .................. 404/34–36, 72, 73, 75
See application file for complete search history.

(56) References Cited

U.S. PATENT DOCUMENTS

| | | | | |
|---|---|---|---|---|
| 2,384,395 | A * | 9/1945 | Payne | E01C 19/522 180/9 |
| 4,277,201 | A * | 7/1981 | Abell | E01C 19/522 404/35 |
| 4,488,833 | A | 12/1984 | Perry et al. | |
| 5,275,502 | A * | 1/1994 | Glaza | E01C 19/522 404/35 |
| 6,779,738 | B1 * | 8/2004 | Stannard | B60B 39/12 238/14 |
| 8,236,392 | B2 * | 8/2012 | Sawyer | E01C 13/02 404/35 |
| 8,628,270 | B2 | 1/2014 | Maritano | |

(Continued)

FOREIGN PATENT DOCUMENTS

| | | |
|---|---|---|
| DE | 1816876 A1 | 5/1971 |
| EP | 2 480 722 A2 | 8/2012 |

(Continued)

*Primary Examiner* — Raymond W Addie
(74) *Attorney, Agent, or Firm* — Merchant & Gould P.C.

(57) ABSTRACT

For the construction of synthetic grass playing fields, a plurality of panels (1, 1', 1") are manufactured by injection molding and stacked in groups (50). Each stacked group (50) is placed on a distributor vehicle (90) moved along a covering direction (Z), so that the panels (1) which compose the group (50) are able to rotate relative to each other with respect to a main direction (X) orthogonal to the covering direction (Z), so that a row of panels is constructed.

15 Claims, 8 Drawing Sheets

(56) References Cited

U.S. PATENT DOCUMENTS

| | | | |
|---|---|---|---|
| 2006/0039754 A1* | 2/2006 | Linville | E01C 13/08 404/73 |
| 2012/0012663 A1* | 1/2012 | Studstill | B60B 39/00 238/14 |
| 2014/0103131 A1* | 4/2014 | Nutzati | B60B 39/12 238/14 |
| 2014/0311075 A1* | 10/2014 | Cormier | E04F 15/225 52/403.1 |
| 2015/0259863 A1* | 9/2015 | van Raam | E01C 13/08 404/34 |

FOREIGN PATENT DOCUMENTS

| | | |
|---|---|---|
| EP | 2 480 722 B1 | 9/2015 |
| WO | 02/086240 A1 | 10/2002 |

* cited by examiner

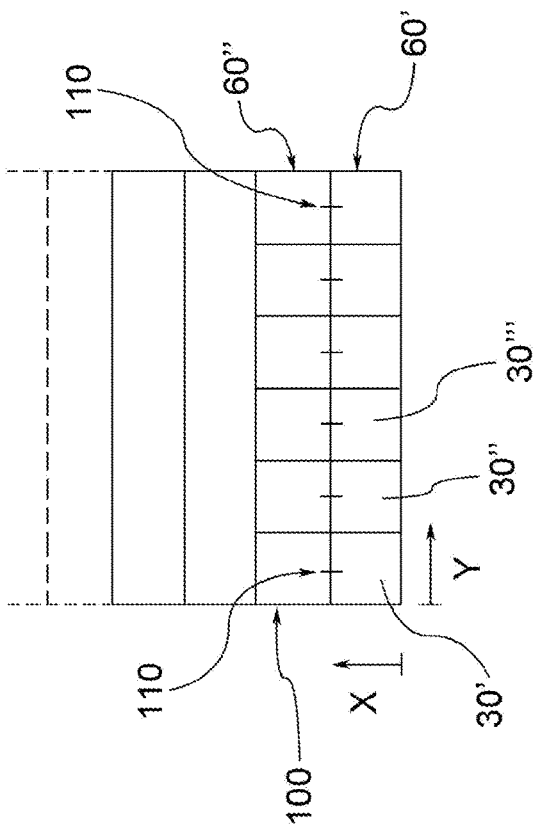
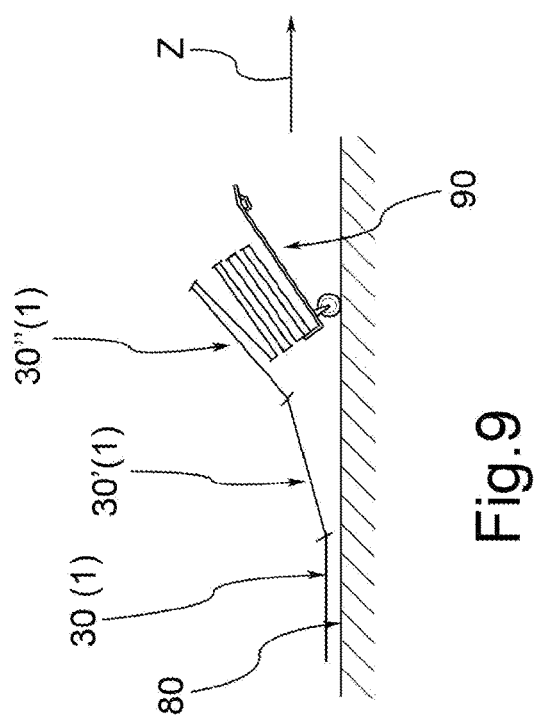
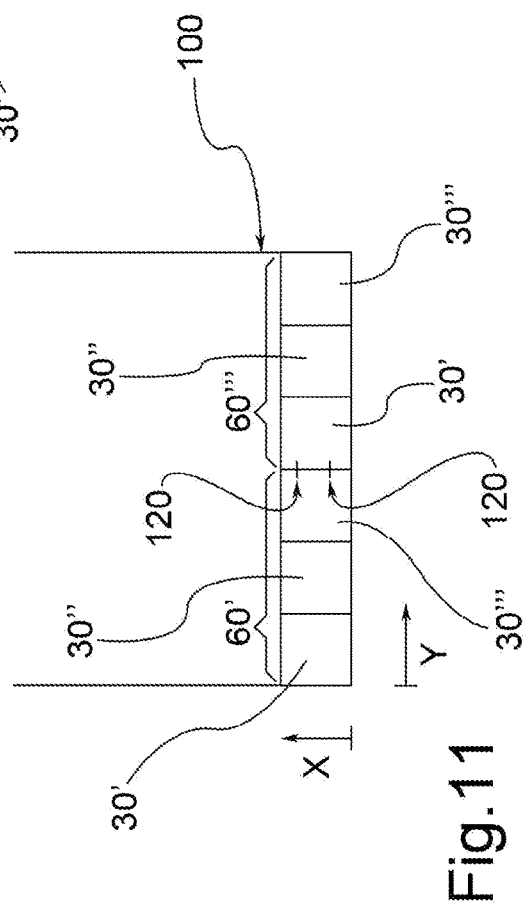

CONSTRUCTION OF A SYNTHETIC GRASS PLAYING FIELDS BY FLOORING PANELS

FIELD OF THE INVENTION

This invention relates to a method of stacking for flooring panels, in particular for the construction of synthetic grass playing fields.

STATE OF THE ART

It is known to construct synthetic grass playing fields by laying between the substrate, usually packed earth, and the synthetic grass covering, an elastically yielding panel, able to provide the field the necessary flexibility, in compliance with regulations set by international bodies.

In particular, the Applicant is the proprietor of European patent EP 2480722 and U.S. Pat. No. 8,628,270, which show an elastically yielding panel for such use.

For the specific application of constructing playing fields, the surfaces to be covered with the panels are very wide.

For example, a football field has minimum regulatory dimensions of 64 m×92 m, and thus a surface area of about 6,000 m$^2$; this implies the production, transport on site and installation of 13,000 panels.

The issues related to the production, transport and installation of these panels are therefore of primary importance.

SUMMARY OF THE INVENTION

The object of this invention is to allow the particularly efficient transport of the panels and their fast and precise installation.

This object is reached by a method for the construction of synthetic grass playing fields, comprising the following steps:
  manufacturing a plurality of panels by injection moulding;
  providing for a substrate;
  laying panels on the substrate for providing a yielding floor, wherein the step of laying panels comprises the steps of:
  i) providing for a stacked group (50) comprising the panels, wherein each panel has an upper surface and a lower surface and are stacked so that the upper surface of a first panel faces the upper surface of a second panel overlying the first one and the lower surface of the secondo panel faces the lower surface of a third panel overlying the second one, and engagement means suitable to make the first panel translate with the second panel along a transversal direction and allowing the relative rotation between the two panels in a main direction perpendicular to the transversal direction;
  ii) providing a distributor vehicle (90);
  iii) placing the stacked group on the distributor vehicle so that the panels which compose the group are able to rotate to each other with respect to the main direction orthogonal to a covering direction causing the successive laying of the panels of the group on the substrate, so that a row of panels is constructed.

BRIEF DESCRIPTION OF THE DRAWINGS

FIG. 9 schematically illustrates a step of an installation method according to this invention;
FIGS. 10 and 11 illustrate covering schemes of an extended surface through rows of panels according to FIG. 5.

DESCRIPTION OF A PREFERRED EMBODIMENT

Figure 2:
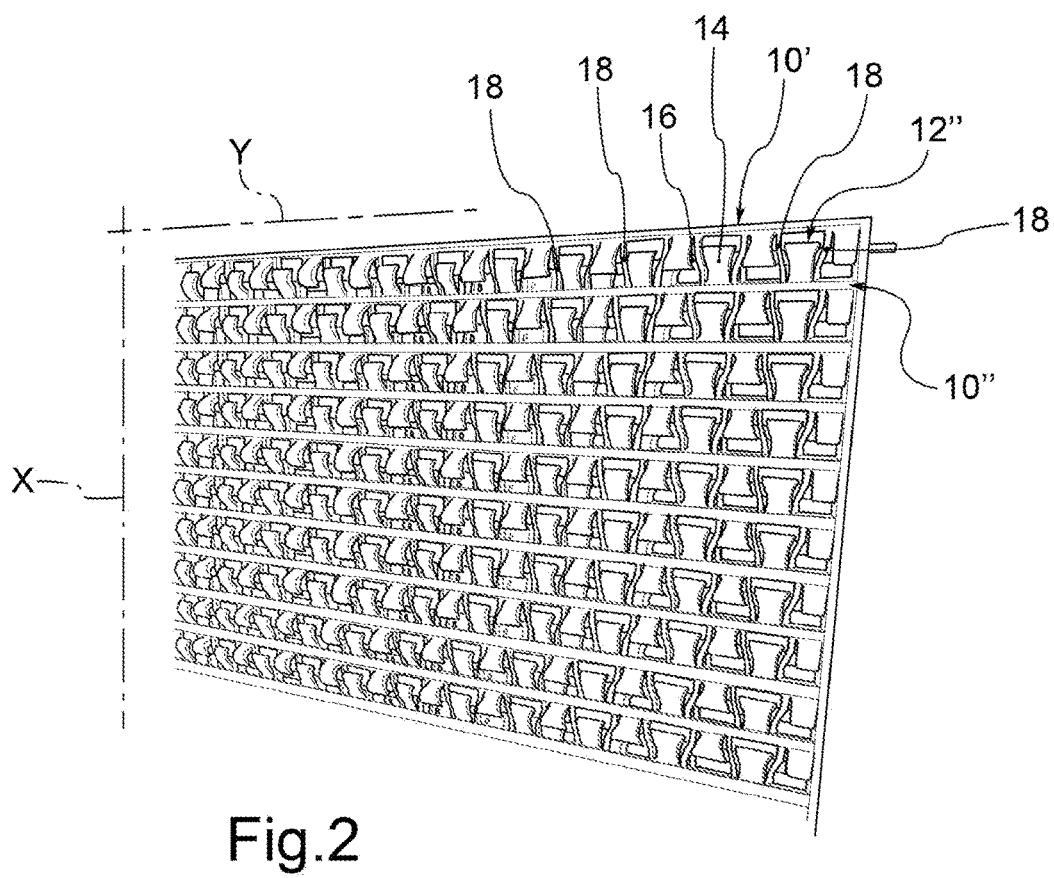
FIG. 2 is a view of a portion of the panel of FIG. 1.
Figure 1:
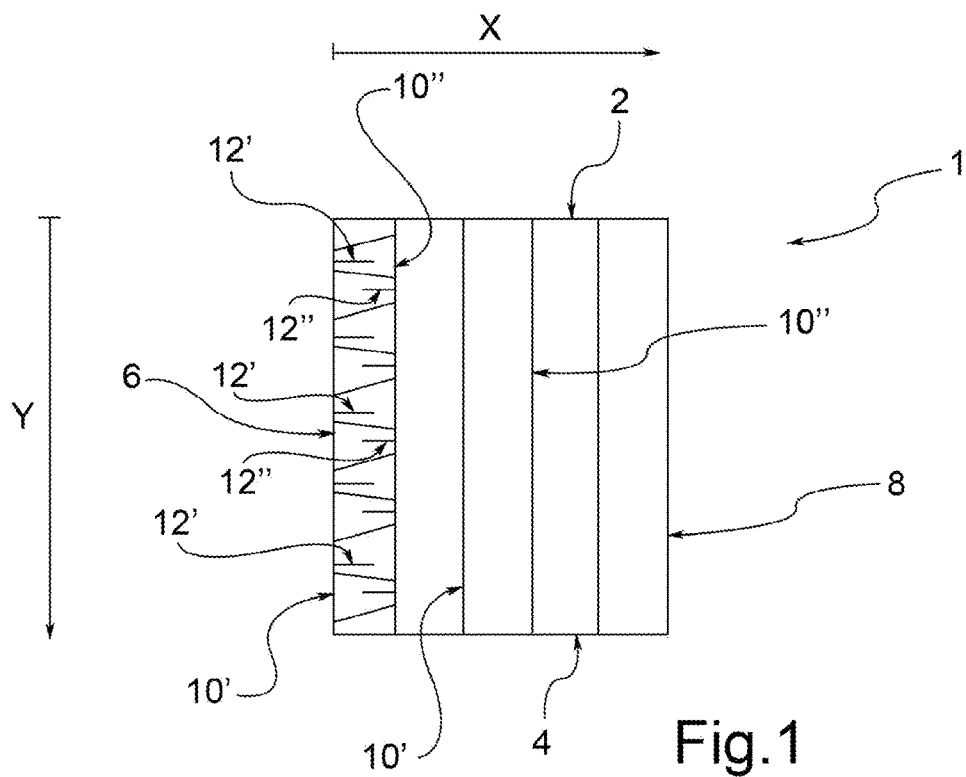
FIG. 1 is a diagram of a panel according to an embodiment of this invention.

With reference to the accompanying figures, reference number 1 denotes, in its entirety, a panel for flexible flooring, schematically illustrated in FIG. 1, which extends in length along a main direction X and in width along a transversal direction Y, preferably made in a single piece by moulding of plastic material.

In particular, the panel 1 comprises main panel edges 2,4 that extend parallel to one another along the main direction X, and transversal panel edges 6,8 that extend parallel to each other along the transversal direction Y, by joining the main edges 2,4 to each other at the ends.

Preferably, in addition, the panel 1 comprises transversal ribs 10 that extend along the transversal direction Y, spaced along the main direction X, by joining the main edges 2, 4 together.

In addition, preferably, the panel 1 comprises a plurality of fins 12', 12" projecting from the rib 10 along the main direction X and spaced transversely.

Preferably, the fins 12', 12" comprise a projecting portion 14, projecting from an upper face of the panel or median plane defined by the edges 2, 4, 6, 8, and a supporting portion 16, fitted to the projecting portion 14 and joined to the rib 10. On the side opposite the upper face, the panel has a lower face.

In particular, from a first rib 10' the first fins 12' project towards an adjacent rib 10" and from the adjacent rib 10" second fins 12" project towards the first rib 10', which insinuate themselves between the first fins 12' of the first rib 10'.

In other words, the first 12' and the second finds 12" overlap transversely.

Preferably, in addition, the panel 1 comprises reinforcement sleepers 18 that extend along the main direction X, transversely spaced, joining to each other adjacent ribs 10',10", arranged between the fins 12',12", preferably between a first fin 12' of the first rib 10' and the adjacent fin 12" of the adjacent rib 10".

The production method of a panel 1 includes a first moulding step, so as to realise the panel in a single piece of plastic.

For example, the moulding is performed as injection moulding using a press 20 comprising a fixed mould die 22 and a moveable mould punch 24; closable on the mould die 22 for the execution of the moulding.

When the mould punch 24 is moved away from the mould die 22, the just moulded panel 1 is applied to the punch mould 24.

The production method then provides, preferably, a step of joining two or more coplanar panels 1 for the formation of a panel assembly 30.

Figure 4:
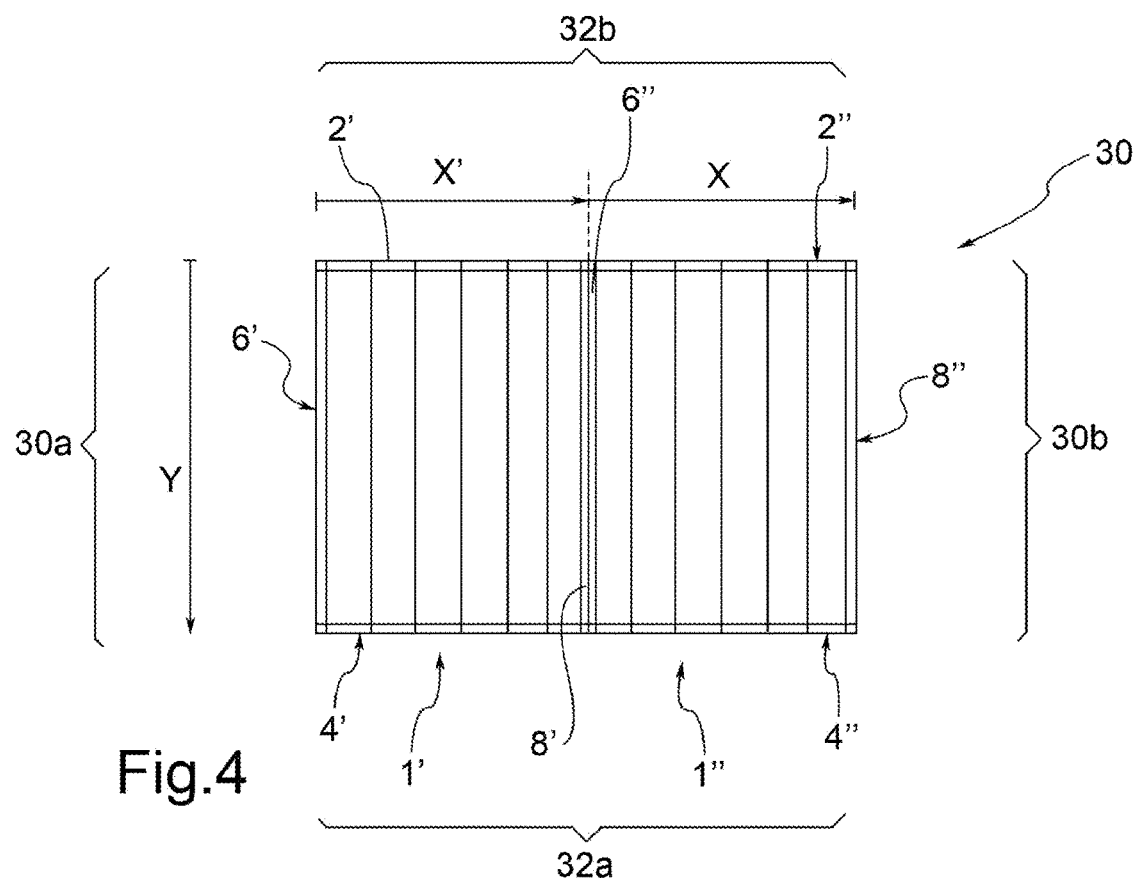
FIG. 4 illustrates a diagram of a panel assembly constituted by two panels according to FIG. 1.

The panel assembly 30 comprises, for example, a first panel 1' and a second panel 1", arranged coplanar, mutually joined in correspondence of the transversal edge; in particular, for example, the transversal edge 8' of the first panel 1' is supported and joined to the transversal edge 6" of the second panel 1" (FIG. 4).

The panel assembly 30 presents, as a whole, transversal assembly edges 30a,30b and main assembly edges 32a,32b, which delimit it, as well as an upper face (from which project the fins of the panels) and an opposite lower face.

For the formation of the panel assembly 30, the moulded panels 1 are arranged in a coplanar and side by side manner, for example along the main direction X, and the adjacent edges 8',6",2',4" are joined together, in a manner continuous or continuous in sections or points, for example by gluing or welding, for example ultrasonic.

According to a preferred embodiment, the method provides a step of taking of the first panel 1' from the mould punch 24 of the press 20, for example by means of a pneumatic picker, and the positioning of the first panel 1' on a joining machine 40, comprising a conveyor 42, for example made of belts 44, 46, capable of advancing the panels along an advancement direction W perpendicular to the edge of the panel to be joined, for example perpendicular to the main direction X.

The joining machine 40 comprises for example an ultrasonic welding station 48.

After arranging the first panel 1' on the conveyor 42, the first panel 1' is made to advance to create the space necessary for the second panel 1"; after also arranging the second 1" panel on the conveyor 42, alongside the first panel 1' so that the transversal edges 8',6" are adjacent, the conveyor makes the two panels advance together, until the two transversal edges 8',6" are brought together in a position suitable for the action of the welding station 48.

The two panels 1', 1" are then welded, creating the panel assembly 30.

For example, the panel 1, 1', 1" has a dimension of 60 cm in the main direction X (length) and a dimension of 80 cm in the transversal direction Y (width); advantageously, the moulding of the panel is thus optimised.

In addition, according to this example, the panel assembly 30, providing the panels 1', 1" joined along the transversal edges 6, 8, has an overall dimension of 120 cm in the main direction X and 80 cm in the transversal direction Y; the main assembly 30 thus occupies the area of a standard pallet, with great advantage for the transportability of a high number of stacked panels.

The production method then comprises a step of formation of a stacked group 50 formed by single panels 1, 1' or 1" or by panel assemblies 30, facing each other and stacked, and mutually engaged so as to allow the relative rotation about a main panel edge 2, 4 or transversal panel edge 6, 8 (for single panels) or about a main assembly edge 32a, 32b or transversal assembly edge 30a, 30b (for panel assemblies).

For clarity of exposition we will hereinafter refer to the formation of a stacked group 50 comprising panel assemblies 30 facing each other and stacked and mutually engaged so as to allow the relative rotation about a main edge 2, 4. According to an embodiment variant, a stacked group comprises single panels facing each other and stacked and mutually engaged so as to allow the relative rotation.

A row 60 comprises a plurality of panel assemblies 30 coplanar and side by side along the transversal direction Y; in particular, the row 60 comprises a first panel assembly 30' and a second panel assembly 30", adjacent to the first 30', arranged so that the main assembly edges 32a', 32b' of the first assembly 30' are aligned along the main direction X at the main assembly edges 32a", 32b" of the second panel assembly 30".

The adjacent panel assemblies 30 in the row 60 are mutually engaged via engagement means 62 suitable to make integral in translation, in particular along the transversal direction Y, the adjacent panel assemblies 30 and allow the relative rotation with respect to the main direction X.

For example, the engagement means comprise at least one ring 64 that connects a main assembly edge 32a' of the first panel assembly 30' with the main assembly edge 32b" of the second assembly 30", adjacent to the first 30'.

The ring 64 allows making a panel assembly panel 30' integral in translation, along the transversal direction Y, to the adjacent panel assembly 30", and at the same time to allow the relative rotation around the other direction, i.e., the main direction X.

Preferably, the engagement means provide play along the transversal direction Y between the panel assembly 30' and the next 30", to allow a mutual accommodation.

For example, the ring 64 has dimensions such that the main assembly edge 32a' of the first panel assembly 30' and the main assembly edge 32b" of the second assembly 30" are not in contact with each other, but have a gap 66 when they are at the maximum distance permitted.

Preferably, in addition, the engagement means 62 comprise two rings 64: the first ring connects the main edge 4' of the first panel 1' of the first panel assembly 30' to the main edge 2' of the first panel 1' of the second assembly 30", and the second ring connects the main edge 4" of the second panel 1" of the first panel assembly 30' with the main edge 2" of the second panel 1" of the second assembly 30".

Figure 5:
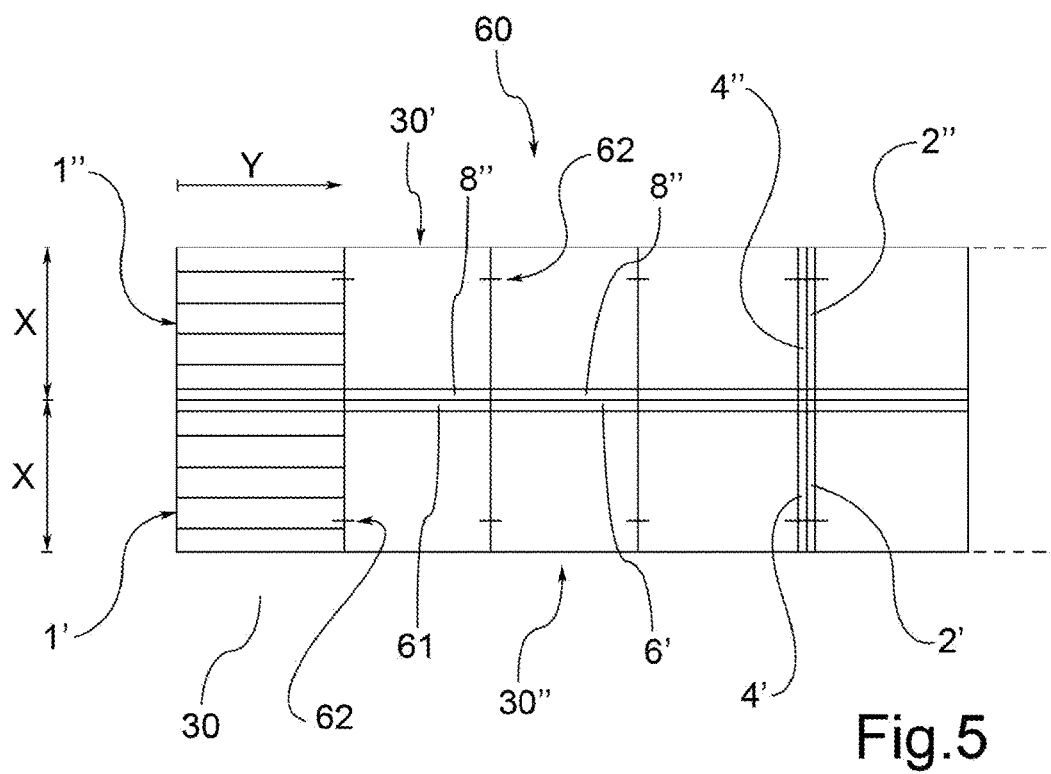
FIG. 5 illustrates a diagram of a row of panels constituted by panel assemblies according to FIG. 4.
Figure 6:
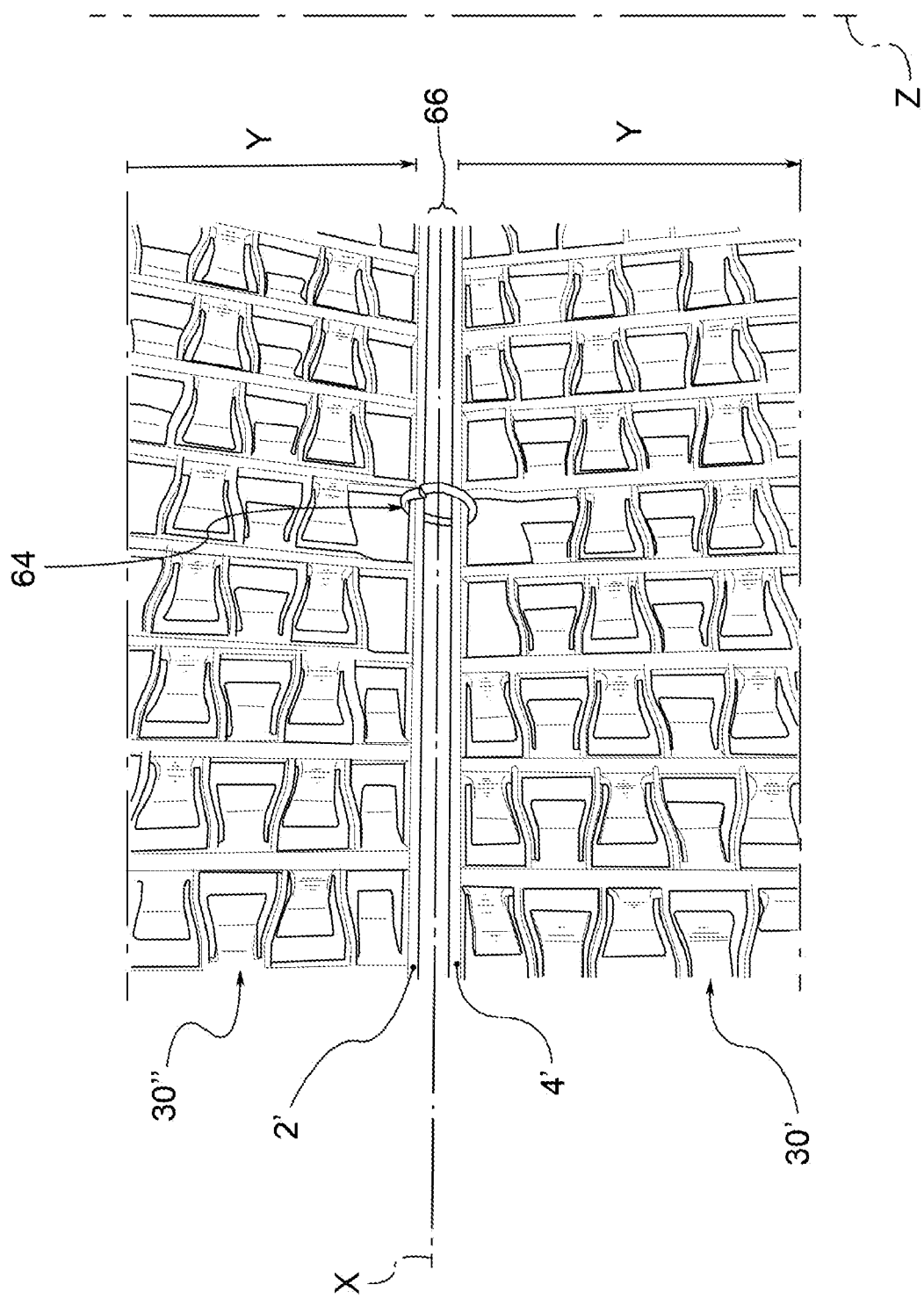
FIG. 6 portrays a portion of a row of panels according to FIG. 5.
Figure 7:
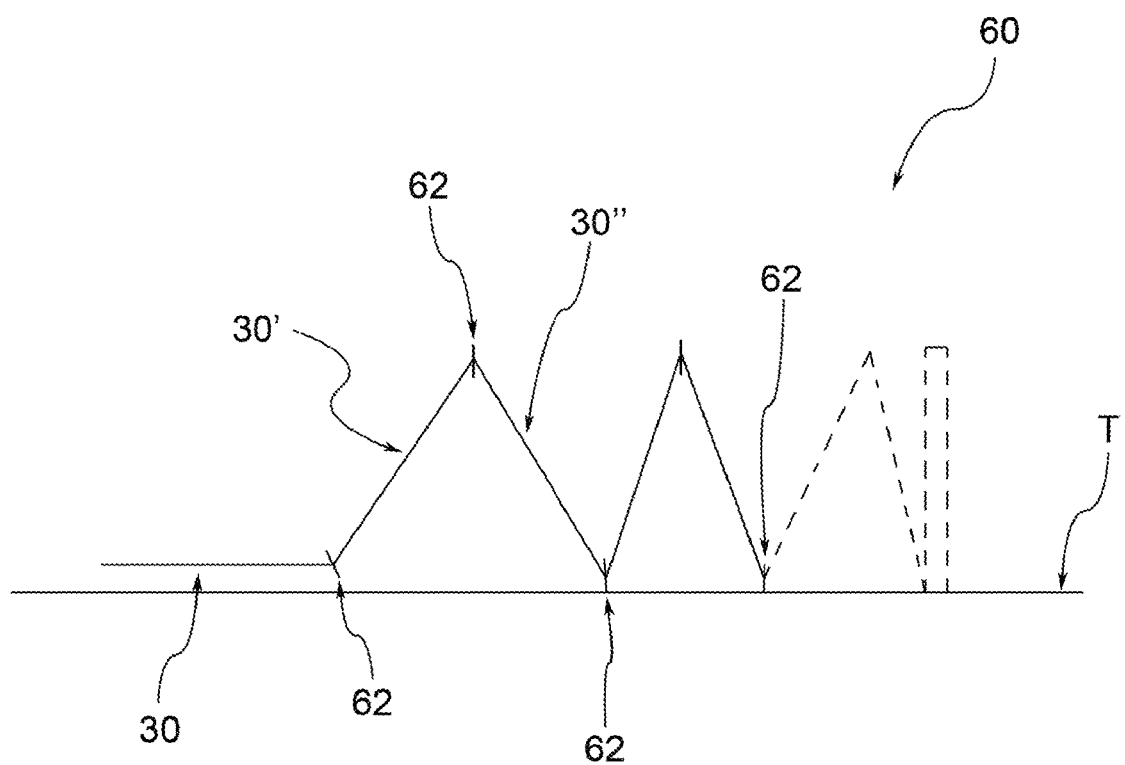
FIG. 7 shows a diagram of a row of panels with panels variously rotated.
Figure 8:
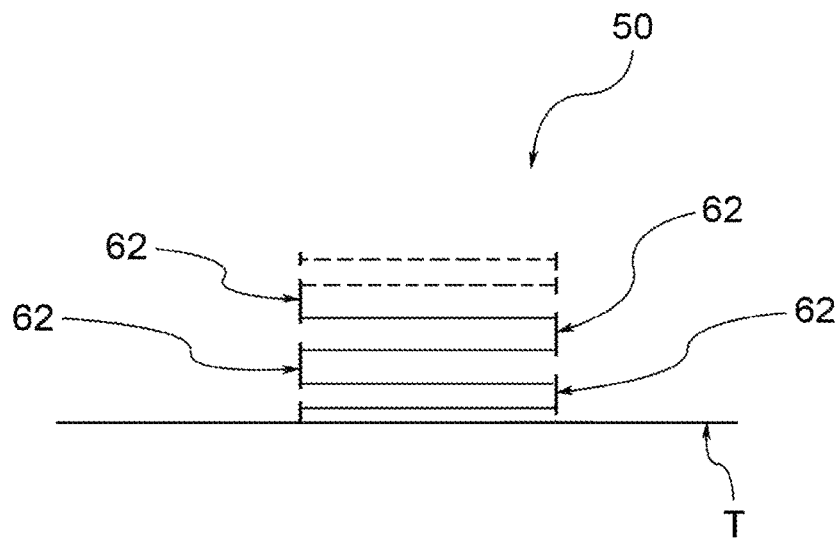
FIG. 8 shows a diagram of a stacked group constituted by panels according to FIG. 1 or by assemblies according to FIG. 4.

The row 60, resting and lying on a ground plane T assumes a substantially planar configuration (FIG. 5); however, by virtue of the engagement means, which allow a relative rotation between the adjacent panel assemblies 30', 30", the panel assemblies assume configurations in which they present a relative inclination angle (FIG. 7), at the limit such as to bring the assemblies 30', 30" to face each other (FIG. 8).

The row 60 in which the assemblies 30', 30" are facing and stacked creates the stacked group 50.

For the step of formation of the stacked group 50, the panel assemblies 30 made by the joining machine 40 pass in an engagement machine 70 comprising a support surface 71, an engagement unit 72 for the application of the engagement means 62 to the panel assemblies 30 and a conveyor 74, for example with belts 76, 78 for moving the panel assemblies 30 on the support surface 71.

For example, the engagement unit 72 comprises guns suitable to apply the rings 64 to the panel assemblies 30.

After placing the first panel assembly 30' on the conveyor 74, the first assembly 30' is made to advance along the transversal direction Y to create a zone for receiving the second assembly 30".

After also placing the second assembly 30" on the conveyor 74, in abutment with the first assembly 30', the two assemblies 30', 30", which are thus placed side by side, are made to advance together, to bring the respective main edges in a position suitable for the action of the engagement unit 72, which applies the engagement means 62.

Preferably, the joining machine 40 and the engagement machine 70 realise a single integrated machine in which the directions of advancement of the respective conveyors 42, 74 are perpendicular to each other.

Figure 3A:
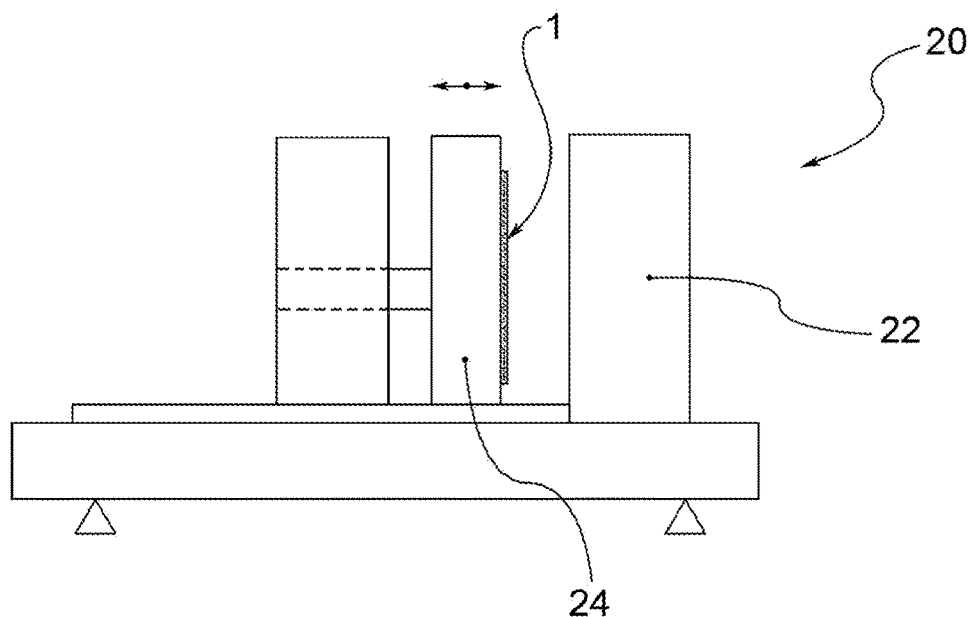
FIGS. 3a to 3e schematically show the steps of a method of stacking the panels according to this invention.
Figure 3B:
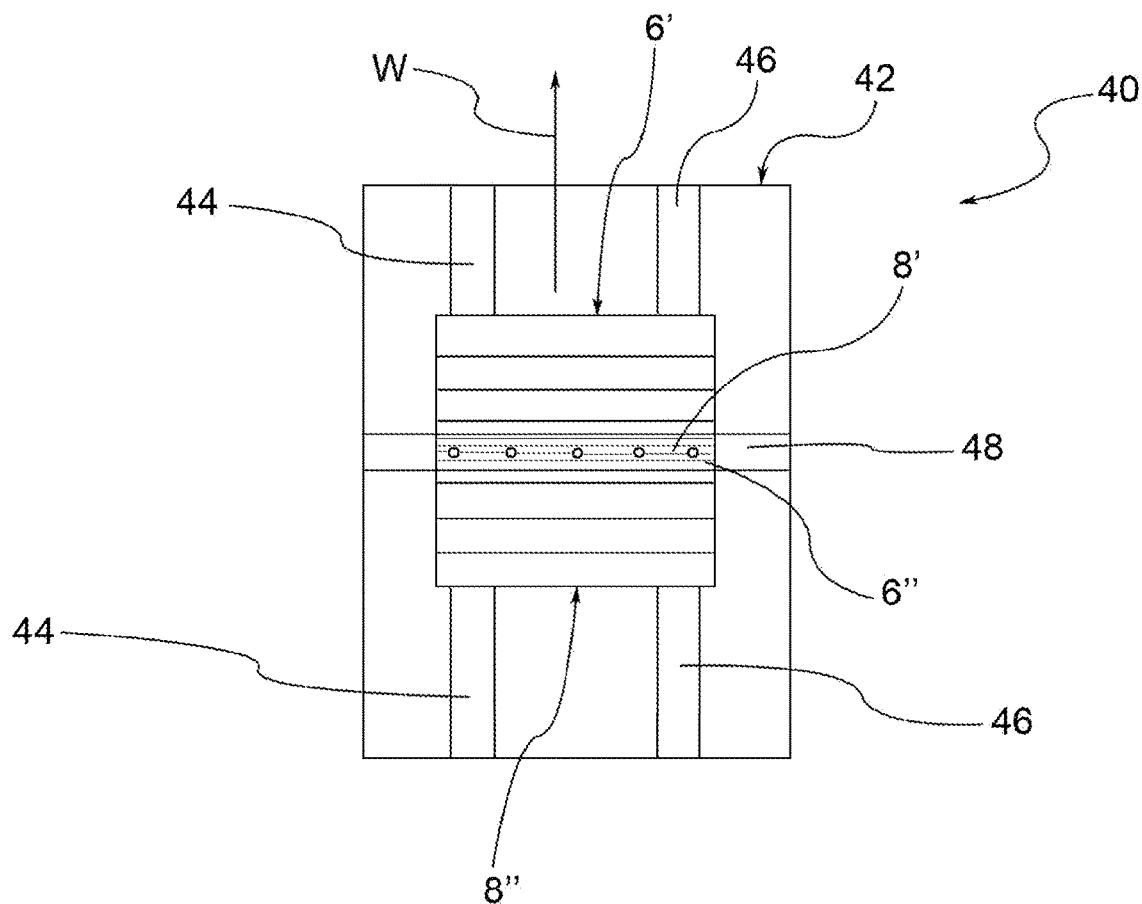
Figure 3C:
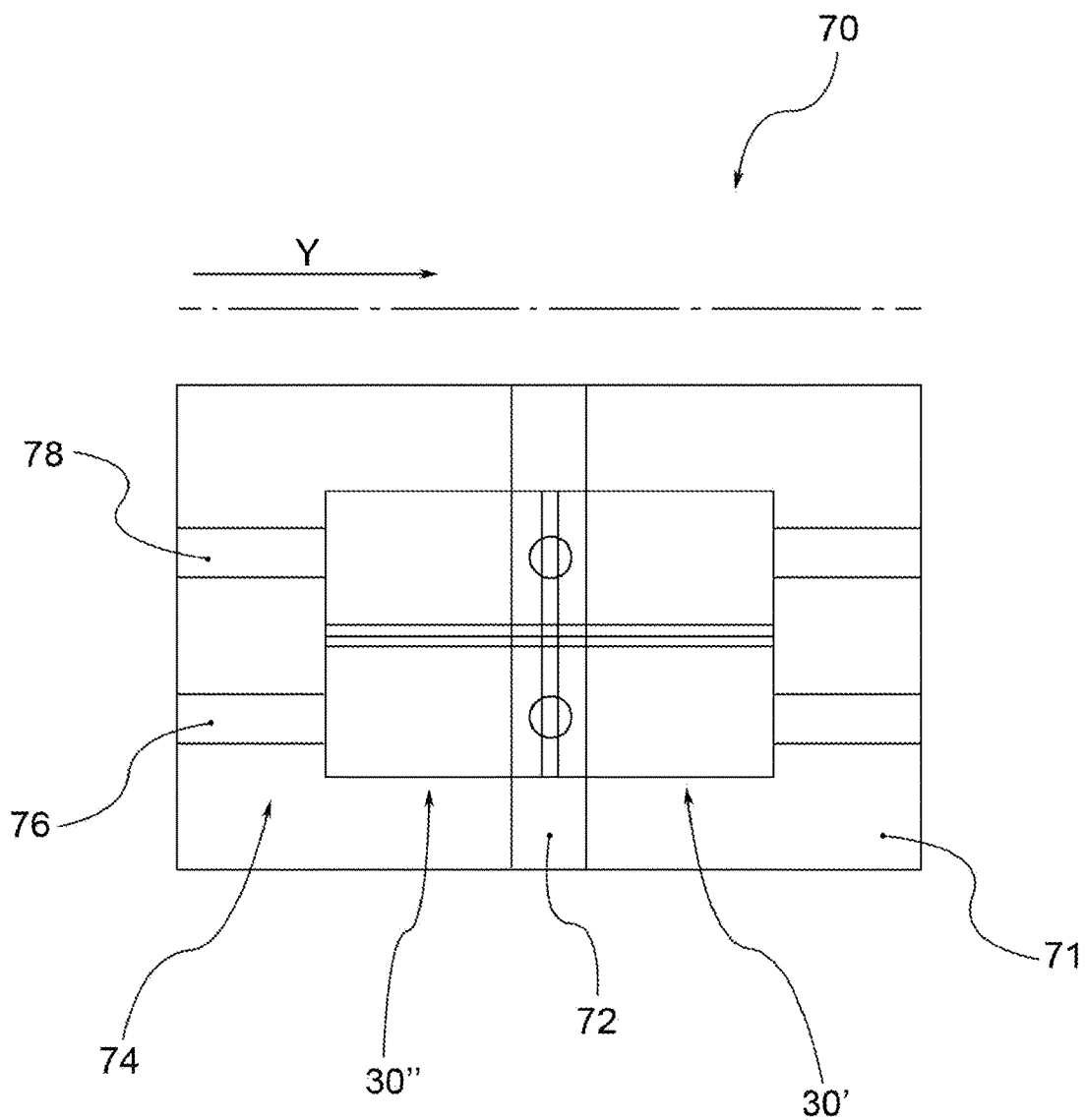
Figure 3D:
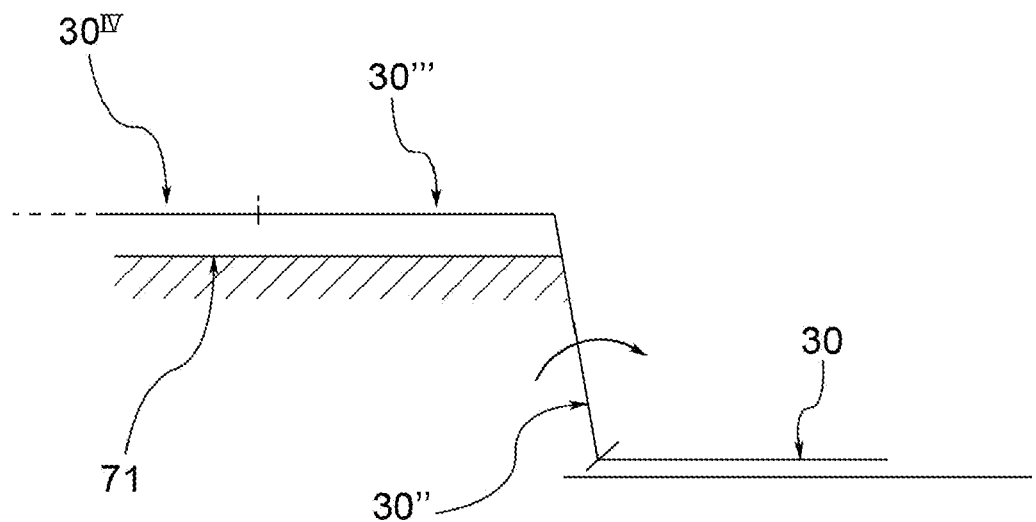
Figure 3E:
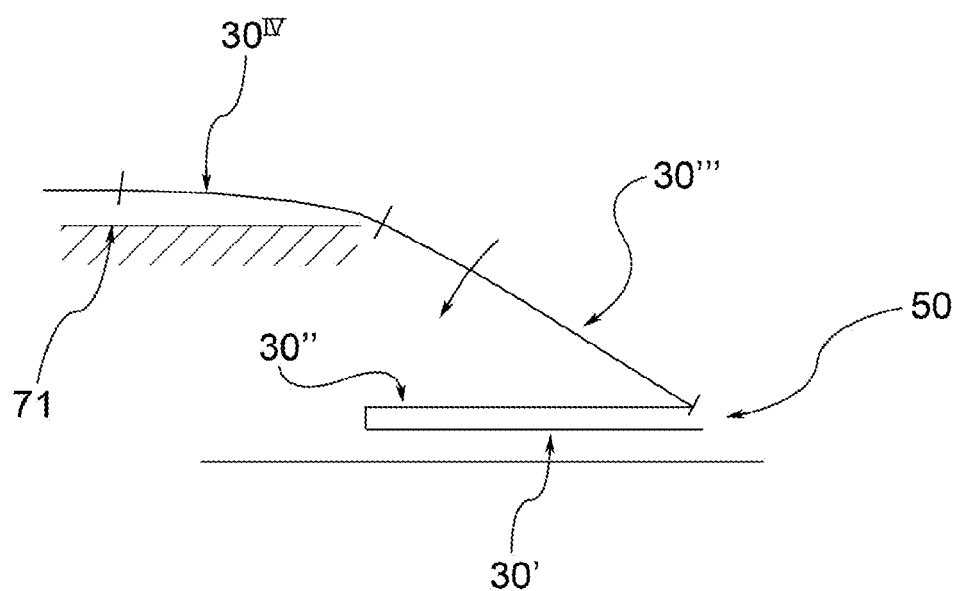

Subsequently, the conveyor 72 advances the assemblies 30',30" engaged to each other and, at the end of the support surface 71, the assemblies fall in succession one on the other and are stacked, alternately overturning, forming the stacked group 50 (FIGS. 3*d* and 3*e*).

The stacked group 50 is suitable to be placed on a standard pallet and to be transported to the place of installation for the realisation of the flooring.

A substrate 80 formed, formed for example of packed earth, is provided for the installation of the panels 1.

The stacked group 50 is arranged on a distributor vehicle 90, for example manual or motorised trolley, so that the assemblies 30 that compose the group 50 can rotate in relation to each other in a main direction X orthogonal to a covering direction Z along which the vehicle 90 moves.

Moving the vehicle 90 along the covering direction Z, the assemblies 30 of the group 50 are lifted in succession and laid on the substrate 80, alternately overturning.

For the coverage of an extended surface 100, several rows 60 are placed side by side along the main direction X; for example, a first row 60' is placed alongside a second row 60" along the main direction X.

After the installation of the adjacent rows 60', 60", the rows are engaged with each other via second engagement means 110, for example comprising at least one secondary ring that connects the transversal edge of the first row 60' to the transversal edge of the adjacent row 60".

Analogously, for the coverage of an extended surface 100, several rows 60 are placed side by side along the transversal direction Y (or covering direction Z); for example, the first row 60' is followed in succession along the covering direction Z by a third row 60'''.

After the installation of the rows in succession 60',60''', the rows are engaged with each other via third engagement means 120, for example comprising at least one third ring that connects the main edge of the first row 60' to the main edge of the row in succession 60'''.

For the realisation of the flooring, for example for a playing field, there follows a step of filling with inert material, for example sand, and finally covering with a layer of synthetic grass.

Innovatively, the stacking method of the panels according to this invention, allows greatly facilitating the transport of high quantities and the installation method, at the same time, a fast and effective laying of the panels for covering wide large surfaces.

Advantageously, in fact, the panels are engaged with each other already in the production step and then arranged to form the stacked group, particularly suitable for rapid installation.

According to a further advantageous aspect, the panels maintain a gap between them, so as to absorb the thermal expansions that occur during laying and that, otherwise, could cause humps or distortions in the installed panels.

It is clear that one skilled in the art, in order to meet contingent needs, may make changes to the stacking method and installation method according to this invention, all contained within the scope of protection defined by the following claims.

What is claimed is:

1. A method for the construction of playing fields, comprising the following steps:
    manufacturing a plurality of panels by injection moulding;
    providing a substrate;
    laying panels on the substrate to provide a yielding floor, wherein the step of laying panels comprises the steps of:
    i) providing a stacked group comprising the panels, wherein each panel has an upper surface and a lower surface and are stacked so that the upper surface of a first panel faces the upper surface of a second panel overlying the first panel and the lower surface of the second panel faces the lower surface of a third panel overlying the second one, and rotatably connecting the panels with a plurality of first rings to make the first panel translate with the second panel along a transversal direction and allowing relative rotation between the first panel and the second panel in a main direction perpendicular to the transversal direction;
    ii) providing a distributor vehicle;
    iii) placing the stacked group on the distributor vehicle so that the panels composing the group are rotatable relative to each other with respect to the main direction orthogonal to a covering direction causing successive laying of the panels of the group on the substrate, so that a row of panels is constructed.

2. A method according to claim 1, comprising the steps of:
    placing a plurality of rows of panels side by side along the main direction;
    engaging the rows placed side by side along the main direction by a plurality of spaced apart second rings extending between sides of the rows of panels.

3. A method according to claim 2, comprising the steps of:
    placing a plurality of rows side by side along the transversal direction;
    engaging each other the rows placed side by side along the transversal direction by a plurality of third rings.

4. The method according to claim 1, wherein the panels comprise a plurality of fins overhanging a median plane defined by perimetral edges of the panels, each of the plurality of fins forming an orifice through the panel, wherein each first ring is extended through one of the orifices in the first panel and one of the orifices in the second panel.

5. The method according to claim 4, wherein each of the panels comprise a rib along the adjacent panel perimetral edges and wherein each first ring is extended through one of the orifices in the first panel and one of the orifices in the second panel and around the rib of the first panel and around the rib of the second panel.

6. The method according to claim 2, wherein the panels comprise a plurality of fins overhanging a median plane defined by perimetral edges of the panels, each of the plurality of fins forming an orifice through the panel, wherein each first ring is extended through one of the orifices in the first panel and one of the orifices in the second panel, and wherein each of the second rings is extended through one of the orifices in a panel in a first row of the side by side rows of panels and through one of the orifices in a panel in a second row of the side by side rows of panels.

7. The method according to claim 2, wherein the panels comprise a plurality of fins overhanging a median plane defined by perimetral edges of the panels, each of the plurality of fins forming an orifice through the panel, wherein each of the panels comprise a rib along each panel edge, and wherein each first ring is extended through one of the orifices in the first panel and one of the orifices in the second panel and around the rib of the first panel and around the rib of the second panel; and wherein each second ring is extended through one of the orifices in a panel in the first row of panels and one of the orifices in the second panel and around the rib of the panel in the first row of panels and around the rib of the panel in the second row of panels.

8. A method of stacking panels for flexible flooring, comprising the steps of:
providing a first panel having main panel edges and transversal panel edges;
providing a second panel similar to the first panel and placing the second panel alongside the first panel so that the first panel and the second panel are coplanar and present adjacent panel edges;
joining the first panel to the second panel along the adjacent edges by a plurality of first rings extending between the main panel edges, forming a first panel assembly delimited by main assembly edges and transversal assembly edges;
providing a second panel assembly and placing the second panel assembly alongside the first panel assembly so that the first panel assembly and the second panel assembly present adjacent assembly edges;
engaging the first panel assembly with the second panel assembly via a plurality of second rings suitable to make the first panel assembly integral with the second panel assembly in translation along a transversal direction, the plurality of second rings extending between transversal edges of the panel assemblies and permitting relative rotation between the first panel assembly and the second panel assembly in a main direction orthogonal to the transversal direction;
stacking the first panel assembly and the second panel assembly so that the first panel assembly and the second panel assembly are facing, forming a stacked group.

9. The method according to claim 8, wherein the panels comprise a plurality of fins overhanging a median plane defined by perimetral edges of the panels, each of the plurality of fins forming an orifice through the panel, wherein each first ring is extended through one of the orifices in the first panel and one of the orifices in the second panel.

10. The method according to claim 8, wherein the panels comprise a plurality of fins overhanging a median plane defined by perimetral edges of the panels, each of the plurality of fins forming an orifice through the panel, wherein each of the panels comprise a rib along each panel edge, and wherein each first ring is extended through one of the orifices in the first panel and one of the orifices in the second panel and around the rib of the first panel and around the rib of the second panel; and wherein each second ring is extended through one of the orifices in a panel in the first row of panels and one of the orifices in a panel in the second row of panels and around the rib of the panel in the first row of panels and around the rib of the panel in the second row of panels.

11. A stacked group comprising:
a plurality of panel assemblies, wherein each panel assembly has an upper assembly side and a lower assembly side and comprises a first panel and a second panel, coplanar and joined along respective adjacent panel edges, wherein the panel assemblies are stacked so that the top side of a first panel assembly is facing the top side of a second panel assembly superposed on the first panel assembly and the lower side of the second panel assembly is facing the lower side of a third panel assembly superposed on the second panel assembly;
a plurality of spaced apart first rings rotatably connecting the first panel assembly to the second panel assembly to make the first panel assembly integral with the second panel assembly in translation in a transversal direction, and to permit relative rotation between the first panel assembly and the second panel assembly in a main direction orthogonal to the transversal direction.

12. The stacked group according to claim 11, wherein the panels comprise a plurality of fins overhanging a median plane defined by perimetral edges of the panels.

13. The stacked group according to claim 12, wherein each of the panels comprise a rib along the adjacent panel perimetral edges, and wherein each first ring extends through one of the orifices in the first panel and one of the orifices in the second panel and around the rib of the first panel and around the rib of the second panel.

14. A method of laying panels for flexible flooring, comprising the steps of:
providing a stacked group according to claim 11;
providing a distributor vehicle;
placing the stacked group on a surface at a rear of the distributor vehicle, the surface extending downward and rearward so that the assemblies which compose the group can rotate relative to each other in a main direction orthogonal to the covering direction along which the vehicle is movable;
moving the vehicle in the covering direction causing successive laying of the assemblies of the group on a substrate;
placing rows of panels side by side along the main direction and joining the rows by a plurality of second rings on transversal edges of the rows of panels.

15. The method according to claim 14, in which rows of panels placed in succession along the main direction, wherein ends of adjacent rows are engaged by a plurality of third rings.

* * * * *